Nov. 16, 1971    B. L. C. SUTCH    3,619,858
INSERT CONVEYING DEVICE FOR AN INJECTION MOULDING MACHINE
Filed March 27, 1969    5 Sheets-Sheet 1

FIG. I

Brian L. C. Sutch
INVENTOR
BY
Lawrence E. Laubscher
ATTORNEY

Nov. 16, 1971  B. L. C. SUTCH  3,619,858
INSERT CONVEYING DEVICE FOR AN INJECTION MOULDING MACHINE
Filed March 27, 1969  5 Sheets-Sheet 5

Brian L. C. Sutch
INVENTOR

BY
Lawrence E. Laubscher
ATTORNEY

United States Patent Office 3,619,858
Patented Nov. 16, 1971

3,619,858
INSERT CONVEYING DEVICE FOR AN INJECTION MOULDING MACHINE
Brian Leo Chudleigh Sutch, Great Bookham, England, assignor to Kingston Plastics Limited
Filed Mar. 27, 1969, Ser. No. 811,042
Claims priority, application Great Britain, Mar. 27, 1968, 14,644/68
Int. Cl. B29c 1/00
U.S. Cl. 18—5 R                           7 Claims

ABSTRACT OF THE DISCLOSURE

A mould insert feeding mechanism wherein a head which is coupled to a variable pressure source of gas is movable between an insert loading station and an insert discharge station, drive means being provided to move the head at the loading station to an extraction position at which the head is adjacent an insert store and at the discharge station to a delivery position adjacent a mould cavity, the store including means to sequentially offer inserts to the head and a control being provided to operate the drives and the pressure source to carry out location of an insert in a mould as a part of a moulding cycle.

---

This invention is concerned with improvements in and relating to moulding machines and more particularly to a feed mechanism for locating in a mould inserts, for example decorative and/or information carrying foil inserts or vacuum formed elements, which are to be incorporated in the mouldings.

It has been proposed to locate inserts in injection and blow moulding machines but the arrangements have been required manual loading the each insert or mechanical gripping of the individual inserts both of which arrangements are cumbersome.

According to the present invention there is provided in or for a moulding machine a mould insert feed mechanism comprising a storage device for receiving a plurality of inserts, means to advance inserts in the store sequentially to for extraction, an insert carrier movable between an insert loading station and a ninsert discharge station, carrier drive means to move the carrier between those stations, a second carrier drive mechanism operable to move the carrier at the loading and discharge stations to and from an insert extraction position and an insert delivery position respectively, pump means operable to provide a subatmospheric pressure at an insert receiving surface of the carrier and a control operable to move the carrier to the loading station, to there move the carrier to the extraction position, there to provide a subatmospheric pressure at the carrier surface, to move the carrier away from the extraction position, to move the carrier to the discharge position, to move the carrier at that position to the insert delivery position and to raise the pressure at the carrier surface to a pressure to release the insert and to withdraw the carrier from the delivery position and from the discharge station to the loading station.

In order that the invention may be well understood there will now be described some embodiments thereof, given by way of example only, reference being had to the accompanying drawings in which, FIG. 1 is a diagrammatic plan view of a part of an injection moulding machine;

Figure 1:
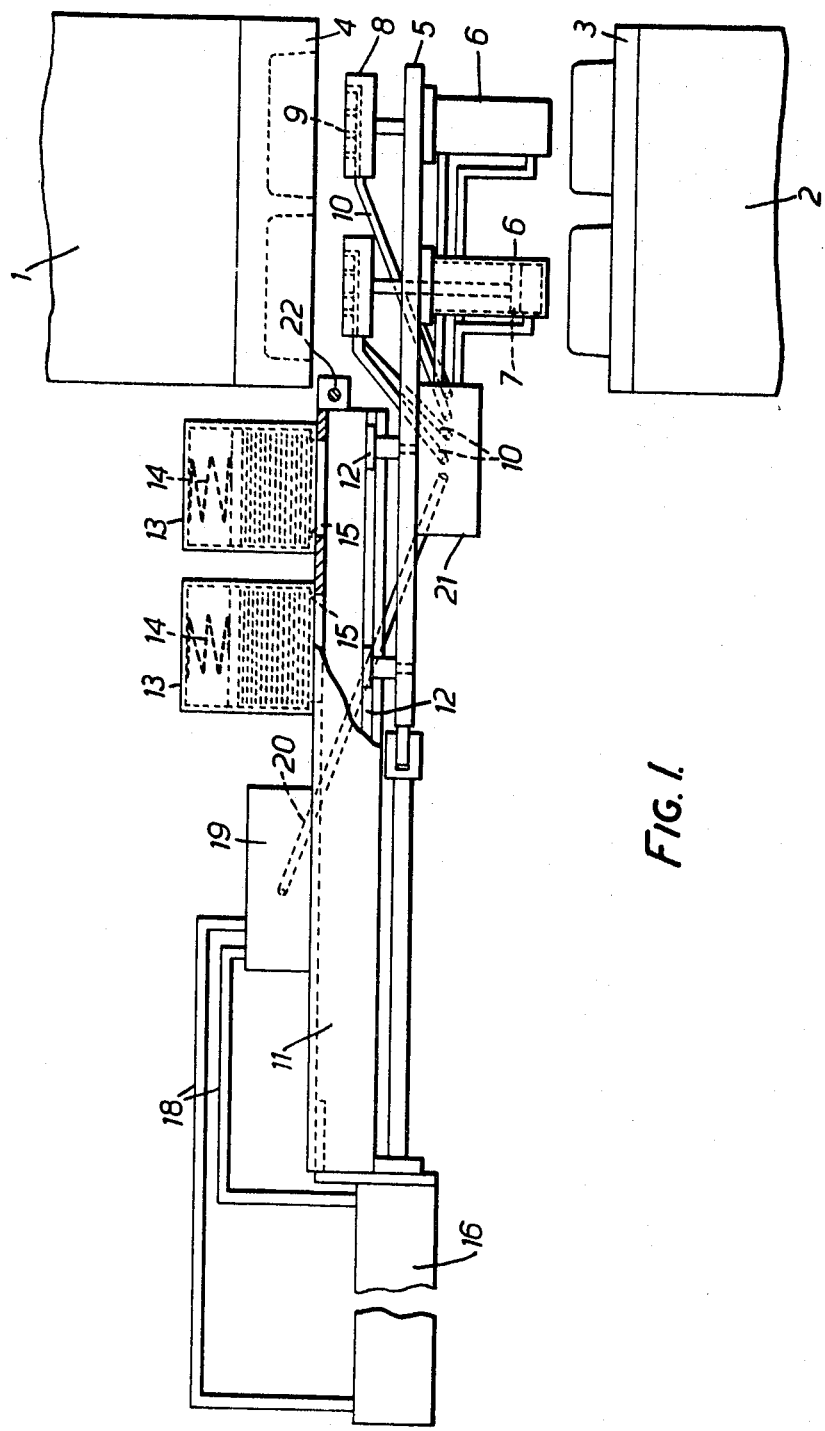
Figure 2:
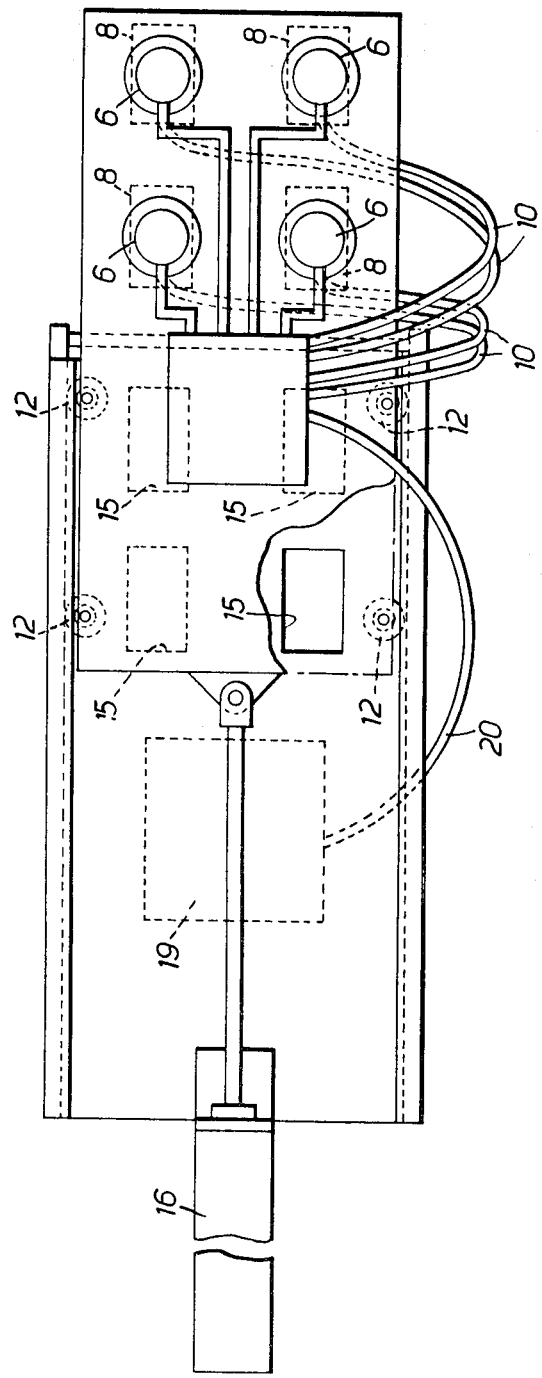
FIG. 2 is an elevation of the carrier and support structure.

The machine shown in FIGS. 1 and 2 comprises relatively movable mould carriers 1, 2 on which are mounted a male tool 3 having four male moulds and a female tool 4 having four female moulds to produce four articles at each injection, two mould pairs only being visible in plan view. Movable into and out of the zone between the moulds when separated is a carriage 5 on which are four cylinders 6 each having a double acting piston 7 coupled to an insert carrier head 8. Each head has passages 9 communicating with a flexible pipe 10 for a purpose which will appear.

The carriage is movable on a support 11, as through wheels 12, between a carrier insert discharge station shown in FIG. 1, and a carrier insert loading station, out of the path of relative movement of the moulds, in which latter stations each head will lie opposite the mouth of a magazine 13. The magazines each accept a stack of foils which will be biased by a spring 14 toward the mouth 15 of the magazine. The foil adjacent the mouth is held from leaving the magazine by a retaining finger or lip (not shown).

A jack 16 mounted on the support is coupled to the carriage to move it between the loading and discharge stations and is coupled by pipes 18 to a control block 19. Flexible connections 20 couple a manifold 21 on the carriage to the control block, the manifold being coupled to cylinders 6 and pipes 10.

At the beginning of a moulding cycle the tools are separated and the carriage is at the loading station with each head opposite a magazine loaded with a stack of foils. Upon initiation of the injection moulding machine cycle, the control block will couple the cylinders 6 to a pressure source and this will cause the heads 8 to move to an extraction position in which each head is adjacent the exposed foil in a stack. Under control of limit switches or stops (not shown) the passages 9 will be coupled to a vacuum source which will cause the exposed foil to be extracted from each magazine and thereafter the pistons 7 will be reversed. This will move the loaded heads away from the magazines which will cause the exposed foil to be extracted from each magazine. When the heads have retracted the jack 16 will move the carriage to the discharge station where the rods 7 will once more be moved outwardly of cylinders 6 to bring the heads 8 to a delivery position adjacent the female mould cavities. The pipes 10 will now be coupled to a pressure fluid source to discharge the foils into the mould cavities.

Beside the path of the heads is a static wand 22 carrying a tension of the order of 12000 volts which will cause the foils to become negatively charged and they will therefore adhere to the mould cavities when they are expelled from the heads.

Upon discharge of the foils the heads will be retracted while still in the discharge station of the carriage, the jack 16 will return the carriage 5 to the loading station to be reloaded and then returned to the discharge station. Meanwhile the injection moulding machine will move the mould halves 3, 4 together, inject the moulding material and then part the mould halves and eject the product. The cycle will then repeat. The foil loading and unloading together with carrier withdrawal may take as little as two seconds to accomplish.

Instead of using a static wand to charge the foil, the air used to expel the foil may be charged and thereby charge the foil.

The heads are shown as flat faced but they may be of any suitable shape and material. Thus the heads may be domed rubber to expel air radially outwardly from between the foil and the mould cavity base and/or to offer the foil up to an uneven mould surface.

Figure 3:
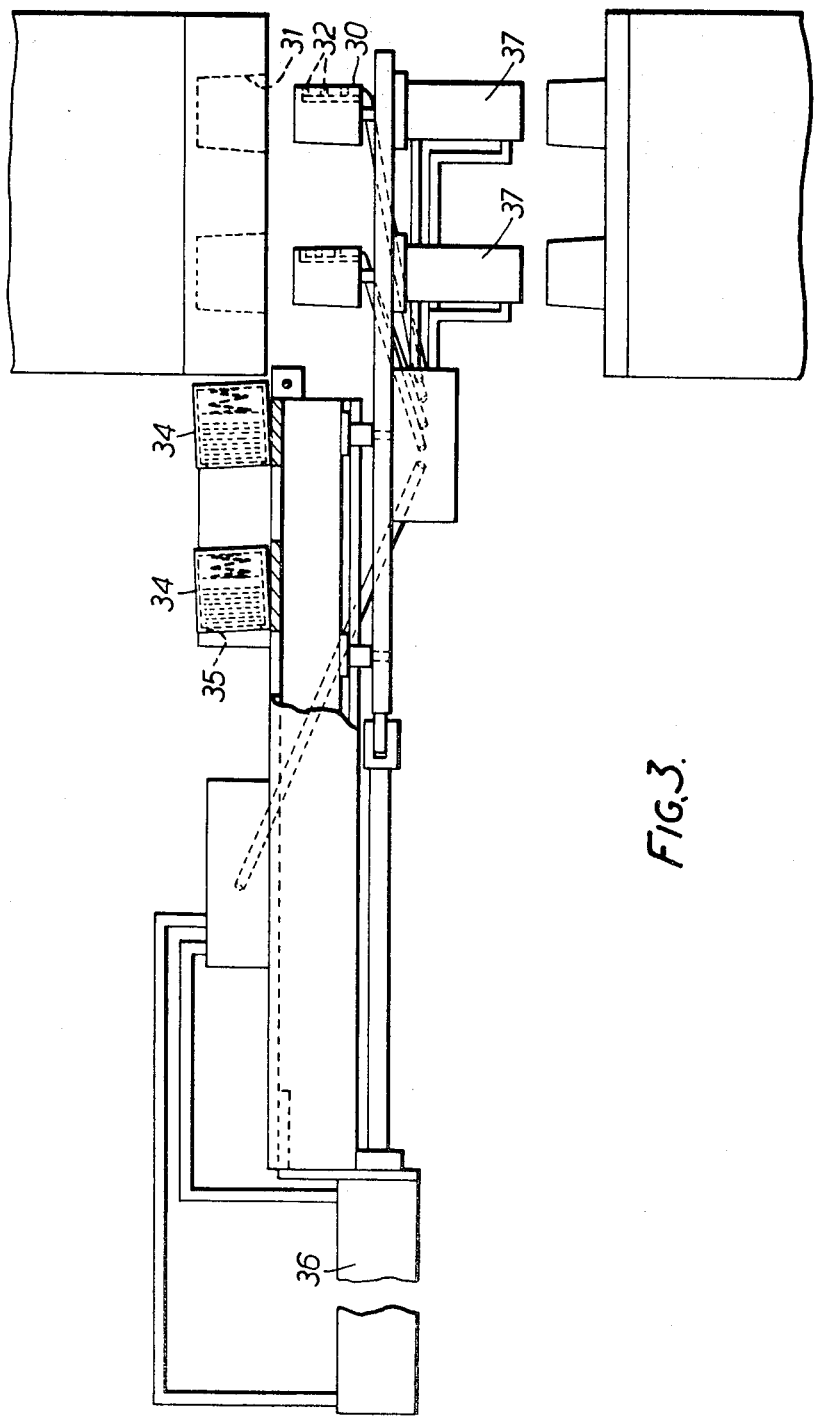
FIG. 3 is a diagrammatic plan view of another embodiment of moulding machine.

The apparatus may be modified to locate foil on a mould cavity side wall, instead of the end wall as described, such as for incorporation in the wall of a tumbler or cup. The apparatus of FIG. 3 will accomplish this. There each head 30 is of a dimension to be movable into a mould cavity 31 at a position clear of the final position of the foil and has passages 32 equivalent to the passages 9 but extending to the face of the finger which will be presented to the cavity side wall. A two stage motion will be provided to move the finger into the cavity and then toward the side wall when in the cavity. Likewise a two stage motion will be used to pick up a foil from a stack 34 which will be normal to the motion of the finger when moving toward and away from the extraction position. The control block in this arrangement will move the fingers forward to a position in which each is adjacent a stack, the jack 36 will move the fingers to the stacks and then away from the stacks, the cylinders 37 will retract the loaded fingers, the jack 36 will move the carriage to the discharge station, the fingers will advance into the cavities, the jack will move the fingers toward a cavity side wall, the foils will be delivered and the fingers will be withdrawn by jack 36, then by their own cylinders 37 and finally the carriage will retract again under the action of jack 36.

Figure 4:
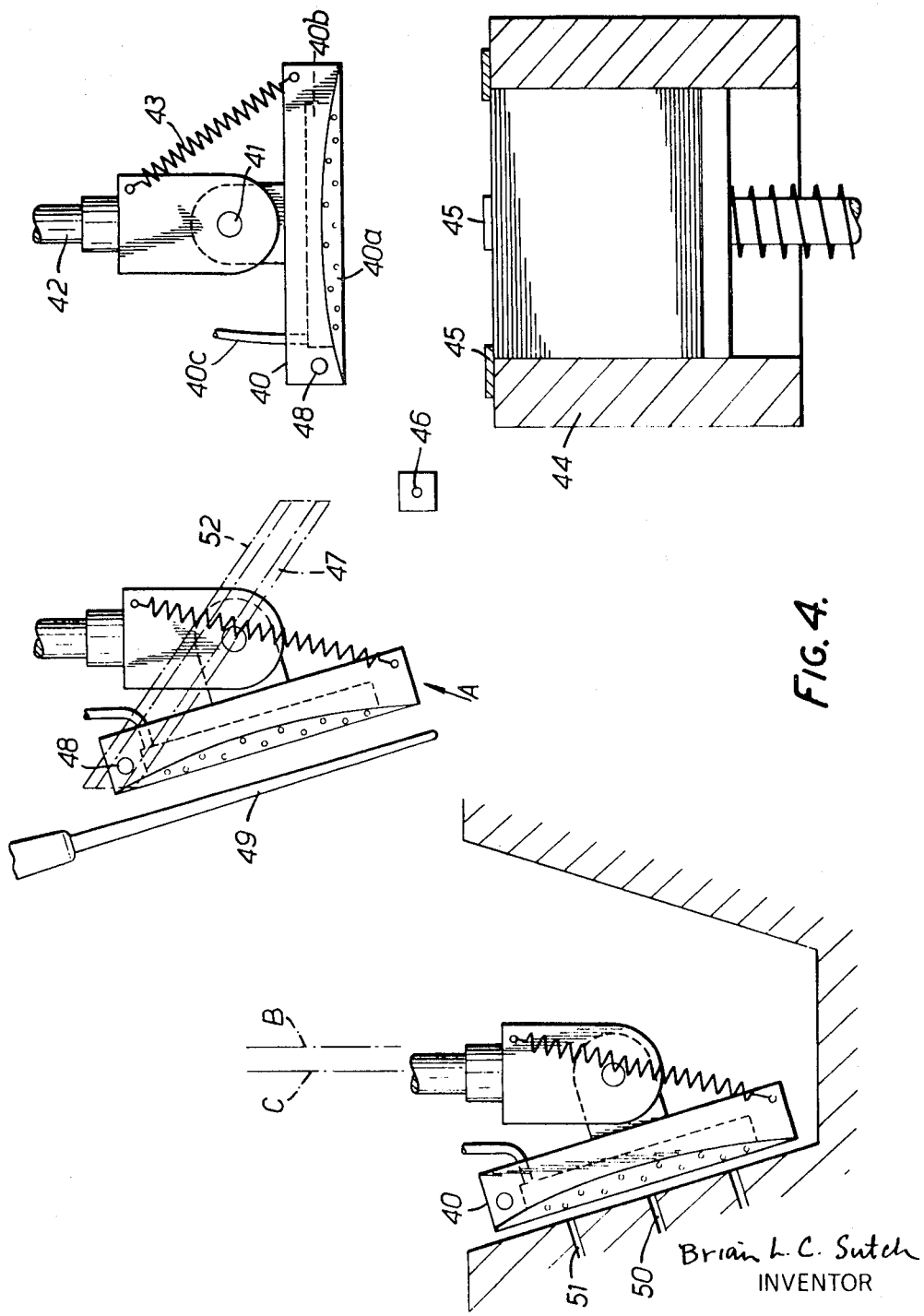
FIG. 4 is a diagrammatic plan view of another embodiment of insert feed mechanism showing various stages in the feeding cycle.

Referring now to FIG. 4 there is shown an alternative arrangement of the heads to feed foils either to the bases of the mould cavities or to the side walls. In this arrangement each head comprises a disc-like member 40 having a perforated curved face 40a extending over a manifold 40b coupled by a pipe 40c to a manifold such as 10 of FIG. 1 pivoted at 41 on a piston rod 42 and biased to a position normal to the rod axis by a spring 43. A magazine 44 similar to the magazines of FIG. 1, is provided for each head in this figure foil retaining lips 45 are shown. A head is shown opposite the magazine in the loading station ready for movement to the extraction position. When loaded the head will move past a static wand 46 and past a cam bar 47 which will be engaged by a stop 48 on the head. This stop will turn the head as it passes along the cam bar to the attitude shown at A. In this attitude the spring will have passed to an over centre condition and will retain the head in that attitude.

To ensure that the foil is applied to the head at the top and bottom as well as at the centre, the most advanced portion of the head at the extraction position, a pair of resilient wipers 49 may be located in the path of the head and spaced less than the height of the head so that passage of the head therebetween will wipe the foil on to the head as the wipers are forced apart by the advancing head.

At the discharge station the head will be advanced along axis B to the delivery position to bring the foil adjacent the mould side wall 50. Then, if desired, a further movement toward the cavity wall may be provided when the piston rod axis will lie advanced to the position C. In returning from the discharge station to the loading station stops 48 will encounter a return cam bar 52 to bring the head to the "face on" attitude for reloading.

To assist in transfer of the foil to the mould and to hold it on that wall, the mould may have passages 51 for coupling to a pump to provide subatmospheric pressure at the mould wall. Such an arrangement may also be included in the moulds of FIGS. 1 to 3. If the foil is required in the base of the mould, the cam stop 48 is withdrawn so that the head remains throughout the cycle in the initial "face-on" attitude. The foil receiving face of the head is as mentioned preferably curved since the mould cavity may be conical, as in the case of a bowl or mug.

Figure 5:
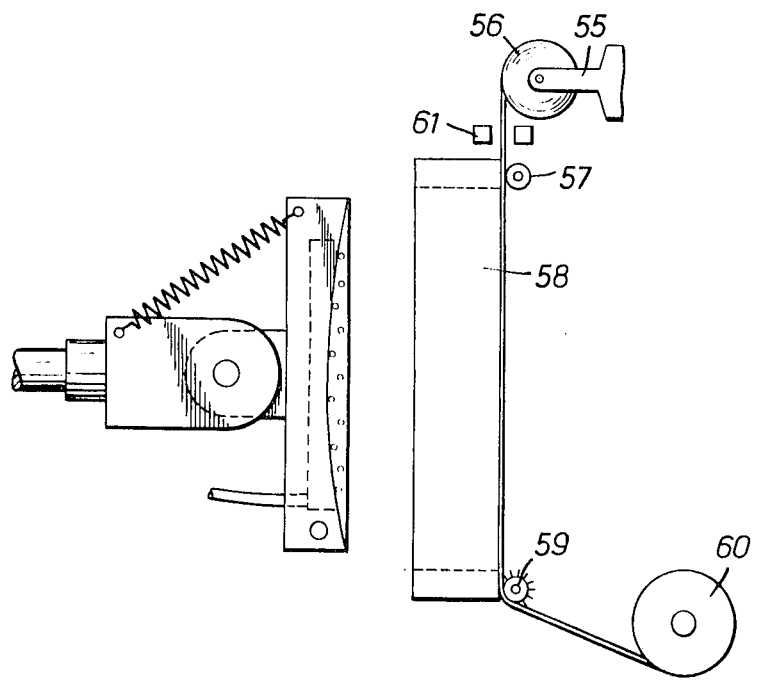
FIG. 5 is a plan view of a further embodiment of foil storage arrangement.

Referring now to FIG. 5, there is shown a foil storage arrangement which comprises a reel holder 55 for receiving a reel 56 of foil which has been punched or otherwise treated to form lines of weakening defining inserts. This foil is threaded around a guide 57, passed a gate 58 over a toothed control roll 59 and onto a take-up reel 60 having a stopping drive (not shown).

In operation the control roll 59 will turn under the action of the take-up reel drive in accordance with information provided by a sensing device 61 which is preferably a light source and photocell between which a perforated zone of the foil will pass. In response to the extraction of a foil by a head, the drive to the take-up reel will draw foil past the gate because the control roll will be released. When a perforation arrives at the sensing device, this will be sensed and as a result control roll will be locked thereby holding the foil with an insert in register with the gate.

The invention is not limited to foils and may be used to handle pre-printed vacuum formed material which can be magazine loaded, such as bowls or mugs which will nest. These can be extracted from magazines loaded into mould cavities and layer injected inside or outside the vacuum formed member. Such a procedure could also be used to give plain two colour articles.

The embodiments described may be used not only for locating inserts in injection moulding machines but also in blow moulding or other types of moulding or pressing machines where access may be had between the mould halves.

I claim:

1. Apparatus for introducing an insert within a mold cavity, comprising a source of said inserts (13);

carriage means (5) mounted for reciprocatory movement between a loading station adjacent said insert source and a discharge station adjacent said mold cavity;

rod means (42) connected with said carriage means for reciprocatory movement normal to the axis of reciprocation of said carriage means and in the direction of said insert source and said mold cavity;

a carrier head (40) pivotally connected with the free extremity of said rod means for pivotal movement about an axis normal to the axis of reciprocation of said rod means, said carrier head including an insert receiving face (40a), said carrier head being pivotable between first and second positions in which said insert receiving face is normal to and angularly arranged relative to the axis of said rod means, respectively;

means for retaining said carrier head alternately in said first and second positions, respectively;

first drive means (16) for moving said carriage linearly between said loading and discharge position;

second drive means (6) mounted on said carriage for operating said rod means to displace said insert carrier head between retracted and extended positions relative to said carriage;

pressure means (10) operable to establish a subatmospheric pressure at the insert receiving surface of said insert carrier head;

control means (19) for sequentially operating said first and second drive means and said pressure means to extend the insert carrier head to the extended position adjacent said insert source when said carriage is at the loading station, to effect a subatmospheric pressure on the insert receiving surface of said insert carrier head, thereby to remove an insert from said insert source, to retract said insert carrier head to the retracted position relative to the carriage, to displace the carriage from said loading station to said discharge station, to extend the insert carrier head to the extended position adjacent the mold, to increase the pressure at the insert receiving surface to effect release of the insert carried thereby, to retract the insert carrier head from the mold cavity, and to return the carriage from the discharge station to the loading station; and means (47, 52) for pivoting said carrier head from said first position to said second position when said carriage means is displaced from the loading station to the discharge station, and for pivoting said carrier head from said second position to said first position when said carriage means is displaced from the discharge station to the loading station, whereby when said carrier head is in the second position, an insert may be deposited on the side wall of the mold cavity.

2. Apparatus as defined in claim 1, wherein said means for maintaining said carrier head in the first position includes spring means (43) normally biasing said carrier head toward said first position.

3. Apparatus as defined in claim 2, wherein said spring means comprises a helical spring, and further wherein said means for maintaining said carrier head in said second position comprises means connecting said helical spring between said carrier head and said rod means in such a manner that when said carrier head is in the second position, said spring means is in a tensioned overcenter locking condition relative to the pivot axis (41) between said carrier head and said rod means.

4. Apparatus as defined in claim 1, wherein said means for pivoting said carrier head between said first and second positions includes stationary cam bar means (47, 52).

5. Apparatus as defined in claim 1, wherein a plurality of corresponding sets of said rod means and said carrier heads are connected with said carriage means.

6. A feed mechanism according to claim 1, in which the insert source comprises a magazine in which the inserts are stored one behind another relative to the extraction position, a platform biased toward the extraction position to urge the inserts theretoward, and stop means for retaining the inserts in the magazine against the action of the platform.

7. A feed mechanism according to claim 1, in which the insert source comprises a reel holder for a reel of sheet material having weakened portions defining the inserts, and a sheet drive mechanism operable to withdraw material from the reel and to present inserts sequentially to the extraction position, said control means being operable to actuate the sheet drive mechanism after extraction of an insert.

References Cited
UNITED STATES PATENTS

| | | | |
|---|---|---|---|
| 2,959,812 | 11/1960 | Allen | 18—5 BL |
| 3,151,193 | 9/1964 | Thornton | 18—5 BL X |
| 3,207,822 | 9/1965 | Makowski | 18—5 BL X |
| 3,292,209 | 12/1966 | Borkmann | 18—5 BL |
| 3,324,508 | 6/1967 | Dickinson | 18—5 BL |

J. SPENCER OVERHOLSER, Primary Examiner

M. O. SUTTON, Assistant Examiner

U.S. Cl. X.R.

18—5 BL; 214—8.5 D; 221—211